Jan. 31, 1956 T. O. SUMMERS, JR 2,732,721
SPRING-DRIVEN GYROSCOPES
Filed Aug. 2, 1954 4 Sheets-Sheet 1

THOMAS O. SUMMERS, JR.
INVENTOR.

BY R. E. Granger

ATTORNEY

Jan. 31, 1956  T. O. SUMMERS, JR  2,732,721
SPRING-DRIVEN GYROSCOPES
Filed Aug. 2, 1954  4 Sheets-Sheet 2

THOMAS O. SUMMERS, JR.
INVENTOR.

BY R. E. Geauque
ATTORNEY

Jan. 31, 1956  T. O. SUMMERS, JR  2,732,721
SPRING-DRIVEN GYROSCOPES
Filed Aug. 2, 1954  4 Sheets-Sheet 3

THOMAS O. SUMMERS, JR.
INVENTOR.

BY R. E. Geauque

ATTORNEY

Jan. 31, 1956 T. O. SUMMERS, JR 2,732,721
SPRING-DRIVEN GYROSCOPES
Filed Aug. 2, 1954 4 Sheets-Sheet 4
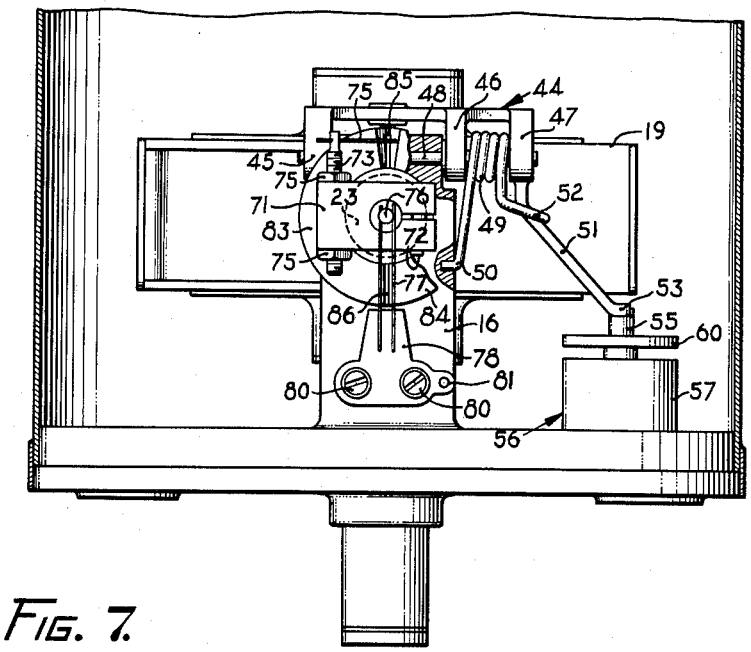
Fig. 7.
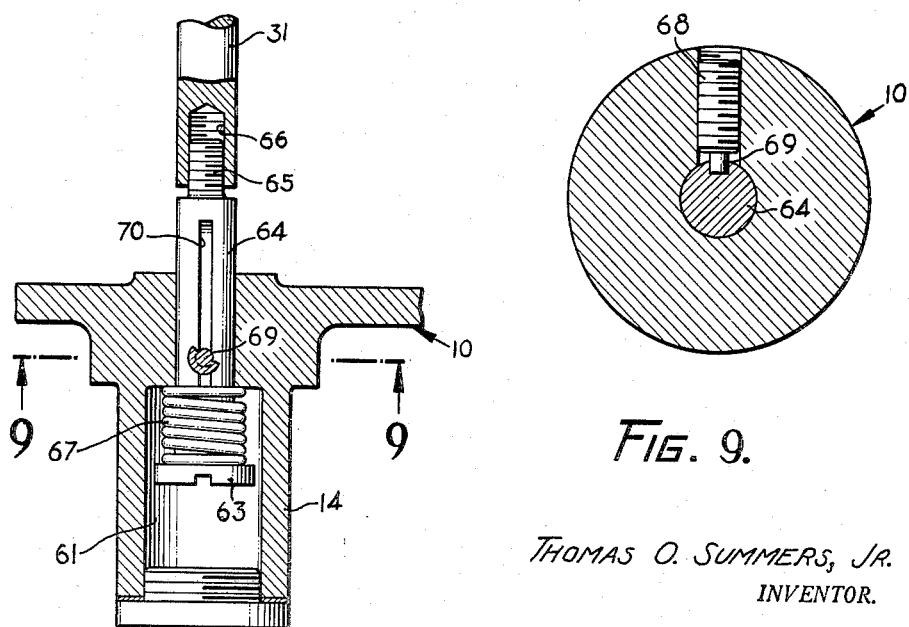
Fig. 8.
Fig. 9.
THOMAS O. SUMMERS, JR.
INVENTOR.
BY R. E. Geauque
ATTORNEY

United States Patent Office 2,732,721
Patented Jan. 31, 1956

2,732,721

SPRING-DRIVEN GYROSCOPES

Thomas O. Summers, Jr., Encino, Calif.

Application August 2, 1954, Serial No. 447,226

24 Claims. (Cl. 74—5.41)

This invention relates to spring-driven gyroscopes and especially to two-gimbal, spring-driven gyroscopes in which the inner gimbal is case erected. In two-gimbal free gyroscopes in which the outer gimbal is employed as a reference substantially fixed in space to register displacements of the craft in which the gyroscope is installed, it is sometimes necessary to case erect the inner gimbal. This is especially desirable whenever the craft is subject to large angular displacements about the inner gimbal axis of the free gyro. To take advantage of the maximum available gyroscopic angular momentum and thereby minimize outer gimbal drift, it is essential that the spin axis be maintained at substantially 90 degrees to the outer gimbal axis.

Heretofore, various complicated devices have been employed to case erect the inner gimbal, or, in other words, to maintain the spin axis normal to the outer gimbal axis. Most of these devices employ a pick-off adapted to signal displacements of the inner gimbal with respect to the case of the instrument and a torquing device responsive to the pick-off to apply a torque about the outer gimbal until the inner gimbal is precessed back to its normal position. Such gyroscopes are commonly employed in missiles expended within a few seconds after firing. It is the practice to bring the gyro to operating speed before the missile is fired for the reason that conventional driving methods require excessively long periods of time to accelerate the gyro to operating speed. Thus, the rotors of gyroscopes mounted in missiles carried by fighter craft operate continually while the fighter is searching for its target so that it may be ready for instant use without warm-up when a target is sighted. Therefore, such gyroscopes must be designed for extremely long life even though they may be used in the missile for only a few seconds.

By the present invention, a case erected, two-gimbal free gyroscope is proposed in which the rotor attains operating speed so quickly that it need not be readied by constant running. Consequently, this gyro need merely be designed for an operating life corresponding to that of the missile. To almost instantly accelerate the rotor to operating speed, the present gyro employs a spring, the potential energy of which is unleashed upon uncaging of the gyroscope. Uncaging is, of course, adapted to occur simultaneously with the missile firing. The rotor of the gyro of the present invention is further designed so that rotor acceleration occurs for a considerable time after uncaging even though the gyro attains operating speed almost instantly. The purpose of continuing acceleration of the rotor is to case erect the inner gimbal of the gyro to a position in which the gyro spin axis is normal to the outer gimbal axis. Whenever the spin axis is inclined to the outer gimbal axis, a torque due to the inertia of the gyro is exerted about the outer gimbal, and this torque is in such a direction as to precess the gyro back to its normal position. So long as the gyro rotor is accelerating, this very effective method of case erecting the inner gimbal is inherent.

Case erection is especially desirable when the missile is first dropped or fired for the reason that in the process of separating from the launching craft some missiles are likely to be violently disturbed. Such disturbances during the launching stage of the missile make rapid case erection of the gyroscope almost mandatory to avoid excessive loss of gyroscopic angular momentum and to avoid gimbal lock. After the missile is free of the launching craft, there may be no real need for case erection, but even then case erection is expedient to minimize drift. Therefore, the driving means of the gyro rotor is designed so that rotor acceleration is continued indefinitely after uncaging. During the brief separation period of the missile from the launching craft, an extremely high erection rate is essential, but thereafter the erection rate can correspondingly decrease. This is taken care of automatically in the present invention because the erecting torque is proportional to rotor inertia, which in turn is proportional to the force exerted by the spring, which is maximum when the gyro commences to spin. Also, during this starting period, the rotor angular velocity is at a minimum and therefore this erecting torque produces maximum erecting precession rate, precession rate being inversely proportional to rotor angular velocity.

In the present invention, a spring is mounted permanently in the gyroscopic rotor so that the mass of the spring adds to the mass of the gyroscopic rotor. In conventional spring-driven gyro rotors, the spring is carried by the case of the instrument with the result that the mass of the spring does not contribute to the mass of the gyro rotor. Thus it may be seen, the gyroscope of the present invention will weigh less than a gyroscope having a rotor of equal mass in which the spring is attached to the case. Also, in such conventional spring-driven gyroscopes, the spring must be completely withdrawn from the gyro rotor before the gyro is uncaged with the result that the gyro must coast thereafter and gradually decelerates. Such negative acceleration has the opposite effect of case erection with the result that the gimbal is precessed away from its normal position.

In the present invention, inasmuch as the spring is mounted in the rotor, dynamic unbalance is inevitable, but in expendable short-life missiles this is not disadvantageous. On the other hand, the vibration resulting from the slight mass unbalance minimizes gimbal bearing friction. Also, the continually accelerating gyro rotor of present invention precludes continuous operation at the gyro's resonant frequency.

It is therefore an object of the present invention to provide a two-gimbal, free gyroscope in which the outer gimbal is employed as a reference and which is case erected about the inner gimbal to maintain the spin axis normal to the outer gimbal axis.

Another object of the present invention is to provide a two-gimbal, spring driven gyroscope in which the potential energy of the spring is unleased with uncaging of the gyroscope and rotor acceleration occurs for a considerable time after uncaging even though the gyro obtains operating speed almost instantly.

A further object of the invention is to provide a spring driven, two-gimbal gyroscope in which the rotor is constantly accelerated after uncaging in order to exert a torque about the outer gimbal axis in such a direction as to case erect the gyro about the inner gimbal axis.

A still further object of the invention is to provide a two-gimbal, spring driven gyroscope in which the erecting torque about the outer gimbal is a maximum when the gyro commences to spin in order to provide maximum erection rate about the inner gimbal upon starting of the gyro and in which the erection rate decreases as rotor acceleration decreases.

Another object of the invention is to provide a spring driven gyroscope in which the spring is permanently attached to the gyro rotor to add to the mass of the gyro rotor and to provide for continuous acceleration of the gyro rotor in order to prevent the gyro from operating at the gyro's resonant frequency.

These and other objects of the invention not specifically set forth above will become readily apparent from the accompanying description and drawings in which:

Figure 7 is an elevational view along line 7—7 of Figure 3 showing the pick-off for the gyroscope partly in section and showing the manner in which the locking device is held in locked position.

Figure 8 is a vertical section along line 8—8 of Figure 3 illustrating the details of the gyro caging mechanism including the spring for pulling the caging pin away from the gyro rotor axis.

Figure 9 is a horizontal section along line 9—9 of Figure 8 showing the guide arrangement for the caging shaft.

Figure 1:
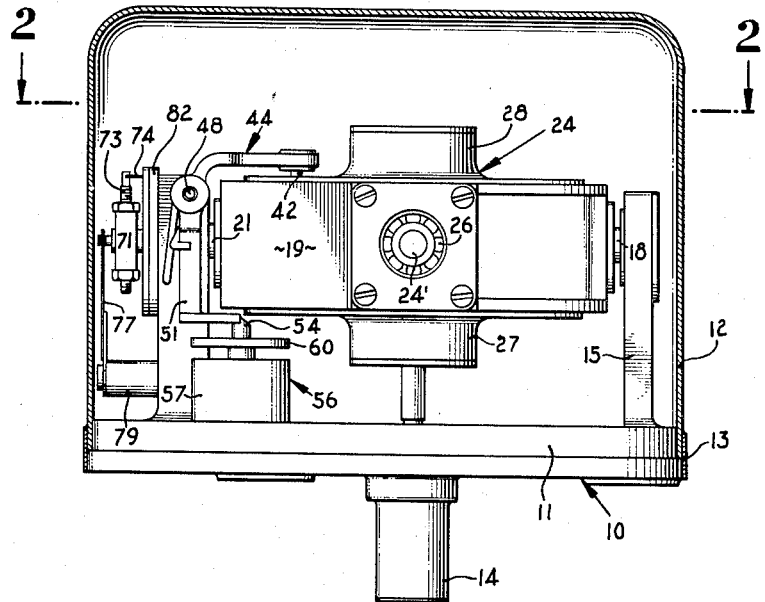
Figure 1 is an elevational view of the gyroscope of the present invention with the casing partially removed to show the outer gimbal of the gyroscope and the spring release mechanism.
Figure 2:
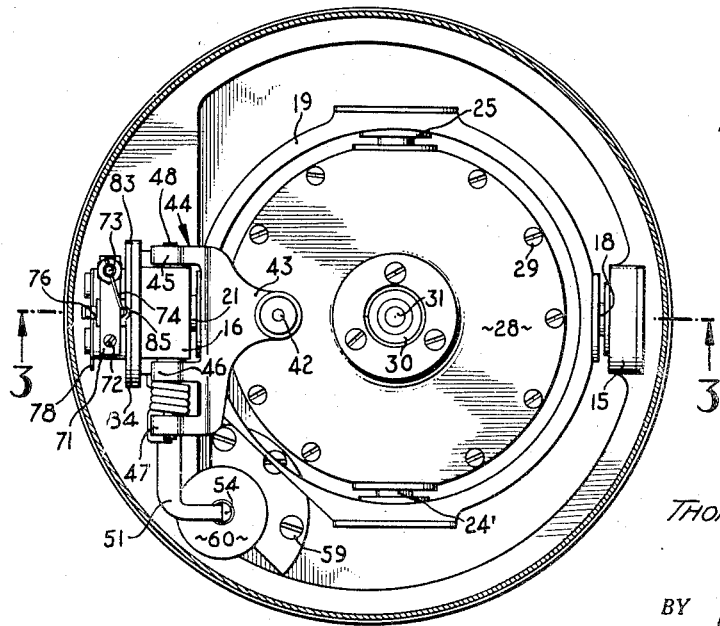
Figure 2 is a top plan view taken along line 2—2 of Figure 1 showing the spring release mechanism and the pick-off for the gyroscope.

Referring to the invention as illustrated in Figure 1, a gyroscope is shown mounted on a base 10 having a portion 11 of reduced in diameter to receive the end of casing 12 and ring 13 secures the casing to the base. A casing extension 14 is shown secured to the base in order to house the caging mechanism which will be later described. Two upright supports 15 and 16 are secured to base 10 and support 15 contains ball bearings 17 for rotatively supporting shaft 18 which is secured to the outer gimbal ring 19 by screws 20. A second shaft 21 is secured to the outer gimbal ring 19 by screws 22 and is rotatively supported within bearing 23 carried by support 16 (see Figure 3). The outer gimbal 19 pivotly supports the inner gimbal 24 about an axis at right angles to the axis of shafts 18 and 21 by means of shafts 24' and 25 which are supported in bearings 26 (only one of which is shown) carried by the outer gimbal ring. The inner gimbal 24 is comprised of a cup shaped member 27 having a cover member 28 secured thereto by means of screws 28' and the members 27 and 28 contain ball bearings 29 and 30, respectively, for rotatively supporting rotor shaft 31. A cup shaped rotor 32 is contained within the inner gimbal 24 and is secured to shaft 31 at hub 33 so that the rotor 32 is mounted for rotation relative to the inner gimbal 24. The member 27 has an extension 34 around which is wound a coil spring 35 and one end 36 of the coil spring is secured to the outer circumference of the rotor by pin 37 while the other end 38 of the coil spring is hooked and secured within a notch 39 in extension 34. Thus, the coil spring can be slipped over the extension 34 while in contracted position and secured by pin 37.

Figure 3:
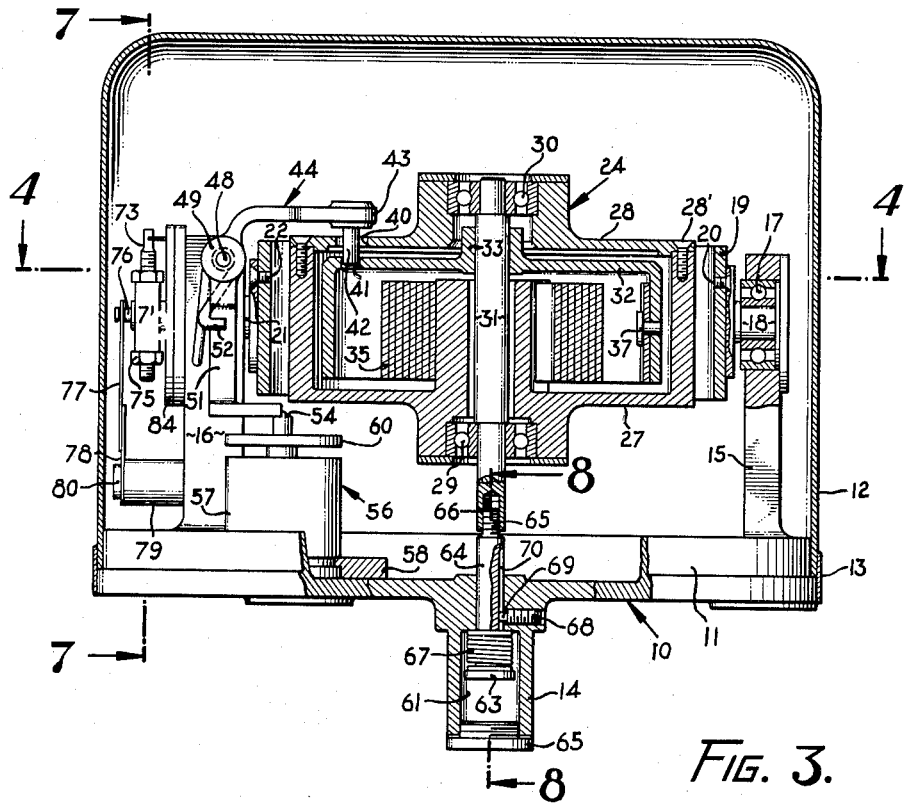
Figure 3 is a vertical sectional view along line 3—3 of Figure 2 showing the spring in compressed position and the caging mechanism in caged position with the gyro rotor locked against rotation.
Figure 4:
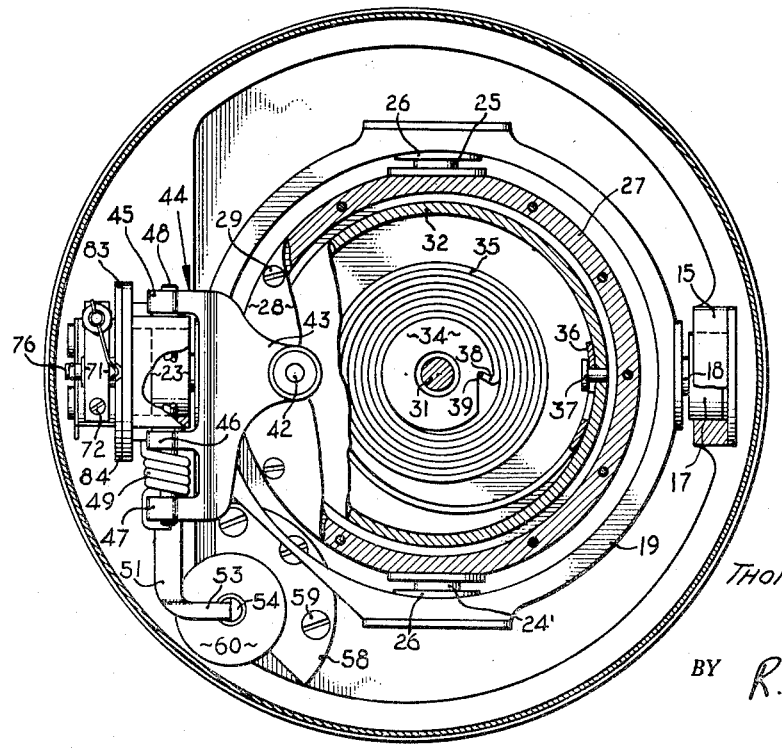
Figure 4 is a horizontal section along line 4—4 of Figure 3 showing the manner in which the spring is connected to the gyro rotor when the spring is in a compressed position.

The cover member 28 and the rotor 32 have openings 40 and 41 respectively for receiving a pin 42 which prevents the rotor from moving relative to the inner gimbal 24 when the pin is inserted as shown in Figure 3. The pin 42 can be withdrawn by the mechanism later to be described in order to free the rotor 32 for rotation by the force of the spring 35 as it unwinds. It is apparent that as the spring 35 unwinds, the rotor 32 will be driven by the end 36 of the spring 35 since the end 38 of the spring is fixed to the casing member 27. Thus, the greatest force of the spring will occur when the rotor is released by pin 42 and the rotor will rapidly accelerate to operating speed.

Figure 5:
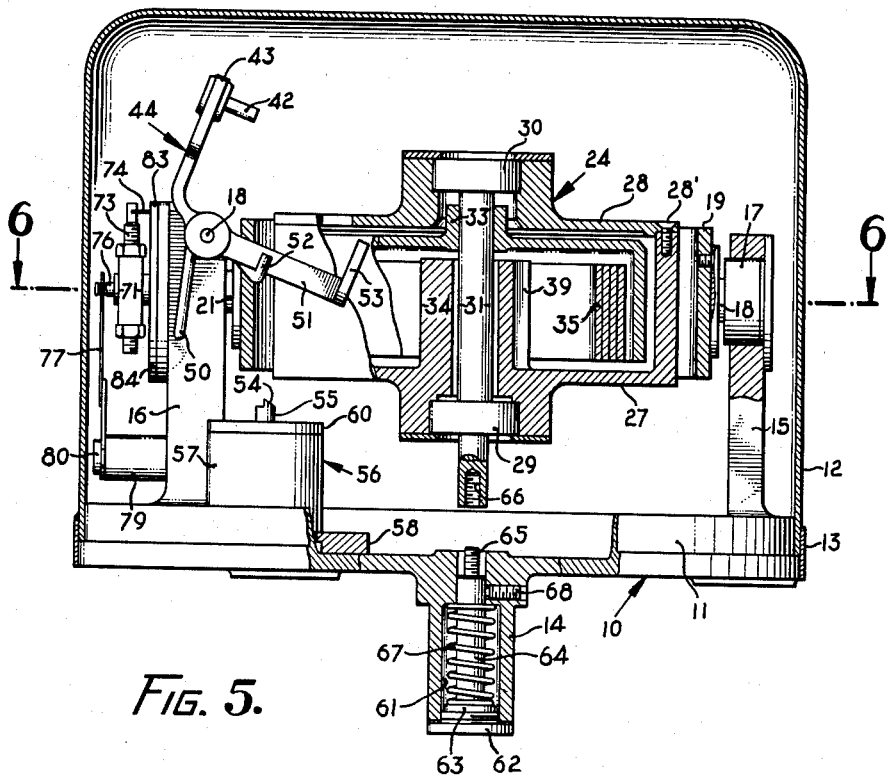
Figure 5 is a vertical sectional view similar to Figure 3 showing the spring in expanded position with the caging mechanism and the rotor locking lever in unlocked position.
Figure 6:
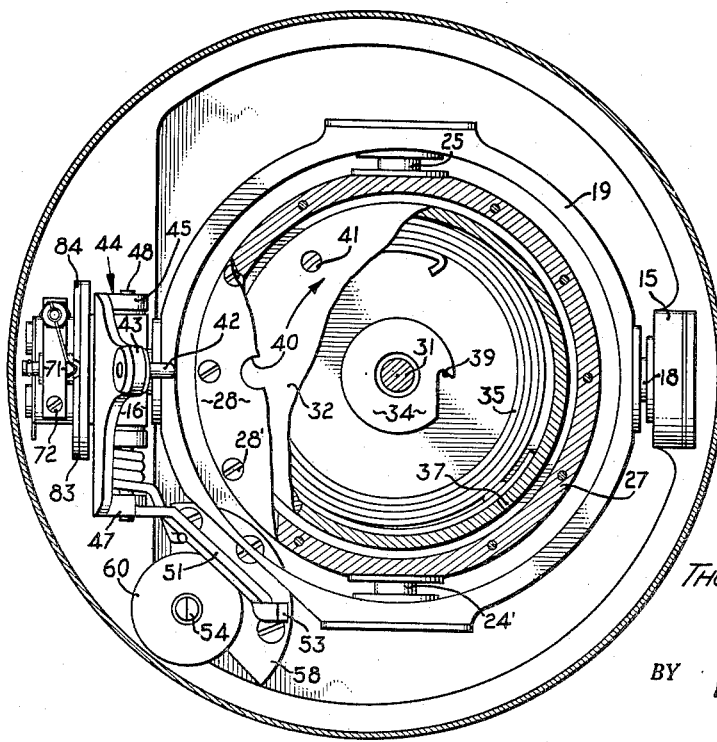
Figure 6 is a horizontal section along line 6—6 of Figure 5 illustrating the manner in which the spring engages the outer circumference of the gyro rotor after it is completely expanded.

The pin 42 is carried by arm 43 of lever 44 and the lever 44 has three projections 45, 46 and 47 which are pivotly supported by a pin 48 passing through the support 16, the extensions 45 and 46 being on opposite sides of support 16. A coil spring 49 surrounds the portion of pin 48 between extensions 46 and 47 and the end 50 of the coil spring is received in an opening in support 16 in order to retain this end in fixed position. An arm 51 is secured to the extension 47 and the other end 52 of the coil spring 49 bears against this arm in order to provide a pivotal force for lever 44. The end 53 of the arm 51 is positioned to engage the notch 54 on the plunger 55 of solenoid 56 when the solenoid 56 is de-energized and the plunger 55 is in the position illustrated in Figures 3 and 7. The solenoid 56 has an outer casing 57 which contains a solenoid winding (not shown) and has an armature 60 secured to shaft 55. The casing 57 is supported upon a base 58 which is secured to base 10 by means of screws 59. When the solenoid is de-energized, the armature 60 is forced away from the casing 57 into the position shown in Figure 7 by a biasing spring (not shown) contained within the casing 57 so that the end 53 of arm 51 is engaged by notch 54 and it is apparent that the lever 44 will be held against rotation by spring 49. Thus, the notch 54 will retain the pin 42 within the openings in cover member 28 and in the rotor 32 and will lock the rotor against rotation by coil spring 35. The locking position of lever 44 is illustrated in Figures 1 through 4 and 7 and Figures 3 and 4 show the coil spring 35 in its compressed condition and ready to start the rotation of the rotor 32. Upon energization of the solenoid 56 by any well-known circuitry, the armature 60 is pulled against the casing 57 and the notch 54 is pulled away from the end 53 of arm 51. The lever 44 is then free to be rotated by coil spring 49 about the pin 48. Such rotation will pull the pin 42 away from the openings in the cover member 28 and rotor 32 in order to free the rotor for rotation. The unlocked position of lever 44 is illustrated in Figures 5 and 6, which figures also illustrate the unwound condition of coil spring 35. It is pointed out that when the spring 35 is completely unwound, the end 38 will leave the notch 39 so that the spring is distributed around the outer circumference of the rotor. The direction of the rotation of the rotor by the spring is indicated by the arrow in Figure 6. The opening 40 in the cover member 28 is substantially larger than the diameter of pin 42 so that as the pin moves about the pivot point 48 of the lever, it will not engage the cover member. The arm 51 of lever 44 is so shaped that when the arm is released by the solenoid 56, the pivotal movement of the lever will not cause arm 51 to engage with any part of the gyro.

The casing extension 14 has an opening 61 which is closed by a cap 62 and the opening contains the end 63 of a caging bolt 64. The caging bolt extends through the base 10 and has a threaded end 65 which is threaded into a threaded opening 66 in the end of the shaft 31. A coil spring 67 is contained in opening 61 and surrounds shaft 64 with one end bearing against the bottom of base 10 and the other end bearing against end 63 of the caging bolt. In order to prevent the caging bolt from rotating, the case 10 has a set screw 68 which has an end 69 positioned within slot 70 in the caging bolt 64. The spring 67 continually exerts a force upon the bolt 64 in a direction to pull the bolt away from the opening 66 in shaft 31. The caging bolt 64 is shown in caged position in Figures 3 and 8 and in this position, the threaded end 65 is secured within the opening 66 in order to hold the gyroscope in its caged position about the inner and outer gimbals. After the rotor 32 has been unlocked by moving the pin 42 away from opening 41, the rotor will be free to turn in a direction that will cause the end 65 to screw out of opening 66. Since the caging bolt 64 is held against rotation and is biased by spring 67 away from opening 66, the shaft 31 will be free of the bolt 64 after the required number of revolutions required to unscrew end 65. Thereafter, the gyroscope will be a two-gimbal, free gyroscope. The uncaged position of bolt 64 is illustrated in Figure 5 and it is seen that the spring 67 holds the end 63 of the bolt 64 against the cap 62 so that there is no possibility that the bolt will thereafter engage the end of shaft 31. It is seen that the uncaging cannot take place until after the gyroscope has been unlocked by pin 42 so that any forces produced by the unlocking of the rotor will not displace the gyroscope from its reference position.

After the gyroscope becomes free in space because of the uncaging action, the gyroscope can be used to provide a reference position about the outer gimbal axes. The shaft 21 extends through the support member 16 and carries a member 71 which has an opening for receiving the shaft and which is secured to the shaft by a bolt 72 passing through the split end of the member. A threaded bolt 73 projects through the other end of member 71 and supports at one end a wiper 74 which can be moved up and down by adjustment of the nuts 75 which secure the bolt 73 to the member 71. A commutator shaft 76 is supported by the end of shaft 21 and a pair of wipers 77 continually bear against this commutator shaft. The wipers are supported by a conducting plate 78 which in turn is secured to an insulated support member 79 by insulated screws 80 which also serve to secure member 79 to support 16. It is understood that a source of electrical energy can be connected to the plate 78 at opening 81 and this electrical source will be applied to the wiper 74 through the commutator post 76 and through electrical wiring (not shown) passing through the member 71. The support member 16 carries an insulated disc 82 to which is secured contact plates 83 and 84 which are semicircular in form and are separated from each other at their ends by spaces 85 and 86. The surfaces of contact plates 83 and 84 adjacent space 85 are tapered so as to receive the end of wiper 74 and provide a null position for the wiper. Suitable electrical wiring (not shown) is provided for each contact plate 83 and 84 so that when the wiper 74 contacts either one of these plates, a proper control signal will result to indicate the direction in which the mounting structure has departed from the gyro reference about the outer gimbal.

The operation of the invention will now be described and it is understood that the two gimbal gyroscope of this invention is suitably adapted for use in the guidance of missiles carried by aircraft and launched from the aircraft upon sighting of the target. Upon separation of the missile from the aircraft, the missile can be subject to a large amount of displacement about the inner gimbal axis and it is therefore important that the gyroscope be case erected about the inner gimbal axis in order to take maximum advantage of the gyroscopic angular momentum of the rotor. The gyroscope of the present invention is carried by its mounting craft with the gyroscope in caged position and the coil spring compressed in a manner illustrated in Figure 3 wherein the rotor is locked against rotation by the pin 42. Upon the sighting of the target, the solenoid 56 is energized in order to move notch 54 and permit rotation of lever arm 44 in order to move pin 42 and release the rotor for rotation. After a small amount of rotation of the rotor, the gyroscope becomes uncaged because of the fact that the caging bolt will unscrew from opening 66 because of rotation of the rotor. Thereafter, the gyroscope is a free gyroscope and serves as a reference substantially fixed in space to register displacements of the craft about the outer gimbal. The coil spring 35 will continue to unwind and will cause the rotor 32 to reach operating speed very quickly and will continue to accelerate the rotor until the coil spring becomes completely unwound and the end 38 moved out of notch 39 in the inner gimbal case.

Because of the fact that the coil spring exerts the greatest force on the rotor just after the rotor is released, the rotor will come up to operating speed very quickly and it is therefore unnecessary to release the rotor prior to the desired time of launching the missile. Also, uncaging will be accomplished at about the same time that the missile is launched. Since the rotor is continually accelerated by the spring even after reaching operating speed, it is possible to use the inherent torque due to the inertia of the gyro in order to maintain the spin axis normal to the outer gimbal axis. As long as the spin axis remains perpendicular to the outer gimbal axis, the torque exerted because of the inertia of the gyro rotor passes parallel with the outer gimbal axis and exerts no torque about the outer gimbal axis. However, when the spin axis is inclined to the outer gimbal axis, a torque due to the inertia of the gyro is exerted about the outer gimbal axis and this torque is in such a direction as to precess the gyro back to its normal position about the inner gimbal axis. Since the erecting torque is proportional to rotor inertia, which in turn is proportional to the force exerted by the spring, a maximum erection torque is available when the missile is first launched and this is highly desirable since maximum disturbances of the missile about the inner gimbal axis can arise during the launching period. Also during this initial period, the rotor angular velocity is at a minimum and therefore the high erecting torque produces maximum erecting precession rate since precession rate is inversely proportional to rotor angular velocity. The continued acceleration of the rotor after the initial launching period of the craft is highly desirable also because the resulting case erection about the inner gimbal axis tends to minimize drift of the gyro away from the reference position. The pick-off, comprised of wiper 74 and plates 83 and 84, provide a reference substantially fixed in space to register displacement of the craft from the outer gimbal axis and spring 35 will continue to drive the gyro rotor until it is completely expanded in the manner illustrated in Figure 6. It is contemplated that by the time the spring is completely unwound, the flight of the mounting craft will be terminated and thus it is apparent that the force of the spring will be exerted throughout the flight to continually accelerate the rotor. However, should the spring unwind before the end of the flight, the missile will still be controlled by the gyroscope, even though the acceleration of the rotor is not continued.

Because of the fact that the spring in the present invention is permanently connected to the gyroscope rotor, the mass of the spring will add to the mass of the rotor. This mounting of the spring will cause dynamic unbalance but such unbalance is not disadvantageous because slight vibration of the gyro rotor will minimize gimbal friction. Also, because of the continuous acceleration of the gyro rotor, it will be impossible for the gyro rotor to operate continually at a speed corresponding to the gyro's resonant frequency. Since the mass of the spring is added to the mass of the rotor, the instrument of the present invention will be lighter than prior devices in which the spring is utilized to bring the rotor up to speed and is then withdrawn. In such prior devices, it is always necessary to have a separate case erection mechanism since the rotor will only experience negative acceleration which has the inherent effect of case erection in the undesirable direction when the spin axis becomes inclined from the normal to the outer gimbal axis.

By the present invention a two-gimbal, spring driven gyroscope has been provided which will give a reference in space about the outer gimbal axis and which will be continually case erected about the inner gimbal axis because of the fact that the gyro rotor is continually accelerated and the torques resulting about the outer gimbal axis from the inertia of the rotor when the spin axis becomes inclined from the normal to this axis will cause erecting torques in the proper direction. Thus, no additional caging mechanism is required and it is apparent that the gyroscopic instrument of the present invention is therefore much simpler in construction than prior devices. Maximum erection torques and erecting rate are obtained during the initial period of rotation when most desirable because of the fact that the erecting torques are maximum and the rotor angular velocity is minimum. Continued acceleration of the rotor after reaching operating speed is highly desirable to prevent loss of the gyroscope angular momentum and minimize outer gimbal drift. In the present invention, it is not necessary to start rotation of the gyroscope until the missile is ready to be fired because the maximum turning force on the rotor occurs upon release of the rotor. It is obvious that the selection of the spring will depend upon the time of flight required by the mounting craft and a spring can be selected such that the rotor acceleration will continue during the expected flight. Also, it is understood that the spring can be replaced by other potential energy means which can be entirely supported by the inner gimbal and utilized to drive the gyro rotor. A novel means of uncaging the gyro is provided in which the uncaging results from the first rotational movement of the rotor after the rotor is unlocked. It is contemplated that the gyroscope of this invention can be mounted in any desired manner within a mounting craft or missile so that the reference pick-off will sense movements about the desired axis of the aircraft. Various modifications are contemplated by those skilled in the art without departing from the spirit and scope of the invention as hereinafter defined by the appended claims.

What is claimed is:

1. A free gyroscope for providing a reference substantially fixed in space, comprising first and second gimbals, a rotor supported by one of said gimbals and means entirely contained by said one gimbal for constantly accelerating said rotor of said gyroscope so that the spin axis of said rotor is maintained perpendicular to the axis of said other gimbal because of the torques resulting from the inertia of the gyro rotor.

2. A free gyroscope for providing a reference substantially fixed in space, comprising an outer gimbal and an inner gimbal carrying a rotor, spring means connected between said inner gimbal and said rotor in order to drive said rotor at a constantly increasing rate, said spring means exerting its maximum force against the rotor when released in order to provide a maximum available erecting torque about the outer gimbal axis in order to rapidly precess the gyro rotor about the inner gimbal to a position so that the spin axis of the rotor is normal to the outer gimbal axis.

3. A free gyroscope as defined in claim 2 having locking means for holding said rotor relative to said inner gimbal until such time as said gyroscope is ready for use.

4. A free gyroscope as defined in claim 3 having caging means responsive to the rotation of said rotor in order to uncage said gyroscope after said locking means has been actuated.

5. A two-gimbal, free gyroscope for providing a reference substantially fixed in space, comprising inner and outer gimbals, a rotor rotatably mounted by the inner gimbal with its shaft perpendicular to the inner gimbal axis, spring means connected between said inner gimbal and said rotor in order to provide a driving force for said rotor, locking means comprising a pivotly mounted lever and a stop for holding the rotor against rotation and means operated in response to a control signal to release said lever from said stop in order to allow said rotor to be driven by said spring.

6. A two-gimbal, free gyroscope as defined in claim 5 having caging means for holding said gyroscope in caged position until after said lever is released, said caging means comprising a slidably movable caging shaft having a threaded end for insertion within a threaded opening in the shaft of said rotor and spring means for moving said caging shaft away from said rotor shaft as the rotor revolves in a direction to unscrew said threaded end.

7. A free gyroscope for providing a reference substantially fixed in space, comprising first and second gimbals, one of said gimbals rotatably supporting a rotor having a shaft perpendicular to the axis of said one gimbal, spring means connected between said rotor and said one gimbal in order to produce a constantly decreasing acceleration force upon said rotor, means for locking said rotor against rotation and means for releasing said locking means to permit said spring means to rotate said rotor at a constantly increasing angular velocity so that erecting torques will be applied about the outer gimbal to move said rotor shaft about the inner gimbal axis towards the normal with the outer gimbal axis whenever said rotor shaft becomes displaced from the normal.

8. A free gyroscope as defined in claim 7 having pick-off means positioned about the outer gimbal axis to signal displacements of the mounting structure of the gyroscope relative to the outer gimbal axis.

9. A free gyroscope for providing a reference substantially fixed in space, comprising first and second gimbal rings, one of said gimbal rings mounting a gyro rotor having a rotor shaft perpendicular to the axis of said one gimbal and spring means connected between said one gimbal and said rotor for continually accelerating said rotor to provide erecting torques about the axis of said other gimbal for maintaining said rotor shaft perpendicular to said other gimbal axis.

10. A free gyroscope as defined in claim 9 in which said spring means comprises a coil spring which exerts maximum accelerating force upon the gyro rotor when the rotor is first released and continues to exert accelerating forces of decreased magnitude upon the rotor.

11. A free gyro as defined in claim 10 wherein said coil spring is permanently connected to said gyro rotor so that the mass of the spring adds to the mass of the rotor, said continuous acceleration of the gyro rotor by said accelerating forces acting to prevent continuous operation of the gyroscope at a resonance frequency resulting from the dynamic unbalance caused by the expansion of said spring.

12. A free gyroscope for providing a reference substantially fixed in space comprising first and second gimbals, a rotor rotatably mounted by said first gimbal with its rotor shaft perpendicular to the first gimbal axis, spring means connected between said first gimbal and said rotor in order to provide a driving force for said rotor, means for locking said rotor against rotation by said spring means and means operated in response to a control signal to release said locking means and allow said rotor to be driven by said spring.

13. A free gyroscope as defined in claim 12 wherein said first gimbal comprises a hollow casing having a central projection and said spring means comprises a coil spring positioned within said casing and around said rotor shaft, the inner end of said spring being secured to said casing projection and the other end of said spring being secured to said rotor.

14. A two-gimbal, free gyroscope for providing a reference substantially fixed in space, comprising inner and outer gimbals, a rotor rotatably mounted by said inner gimbal with its spin axis perpendicular to said inner gimbal axis, spring means connected between said inner gimbal and said rotor in order to provide a driving force for said rotor, said spring means exerting acceleration forces of decreasing magnitude upon the rotor as said spring means unwinds, locking means comprising a pivotly mounted lever and a stop for holding said rotor against rotation, and means operated in response to a control signal to release said lever from said stop in order to allow said rotor to be driven by said spring, said spring means exerting maximum force upon the rotor when the rotor has minimum angular velocity so that when the spin axis of said rotor becomes tipped from the perpendicular with respect to the outer gimbal axis, the gyroscope will be erected about the inner gimbal axis at maximum rate back to perpendicular position.

15. A free gyroscope for providing a reference substantially fixed in space, comprising first and second gimbals, a rotor supported by one of said gimbals and potential energy driving means for said rotor entirely supported and contained by said one gimbal and entirely independent of power means exterior of said one gimbal.

16. A free gyroscope as defined in claim 15 wherein said one gimbal comprises a casing for receiving said rotor, said driving means being entirely contained within said casing.

17. A free gyroscope as defined in claim 15 having means for selectively releasing the potential energy of said driving means in order to drive said rotor at a constantly increasing velocity and means responsive to rotation of said rotor for uncaging said rotor.

18. An uncaging device for a gyroscope comprising a gyro rotor supported by a rotor shaft, means slidably supported by the casing of said gyroscope and threaded into said shaft, and means for urging said slidable means away from said shaft, said slidable means being unthreaded from said shaft upon rotation of said rotor in order to uncage said rotor.

19. A free gyroscope for providing a reference substantially fixed in space, comprising inner and outer gimbals, a rotor supported by said inner gimbal, potential energy driving means for said rotor entirely contained within said inner gimbal, means for releasing said potential energy means and means responsive to said releasing means to uncage the gyroscope.

20. A free gyroscope for providing a reference substantially fixed in space, comprising inner and outer gimbals, a rotor supported by said inner gimbal, potential energy driving means for said rotor entirely contained within said inner gimbal, and means operable to release said potential energy means and uncage said gyroscope.

21. An uncaging device for a gyroscope comprising a gyro rotor supported by a rotor shaft, a movable means supported for bodily movement only relative to said shaft, and connecting means for connecting said movable means and said shaft prior to rotation of said rotor and operable by relative rotation between said shaft and said movable means to disconnect said shaft from said movable means and uncage said gyroscope.

22. A gyroscope comprising a rotor, a gimbal for rotatively supporting said rotor, potential energy driving means for said rotor entirely contained by said gimbal, and means for releasing said potential energy means in order to rotate said rotor.

23. A gyroscope comprising a rotor, a gimbal for rotatively supporting said rotor, spring means connected between said gimbal and said rotor for providing a driving force for said rotor, and means for releasing said spring means to permit said spring means to rotate said rotor.

24. A gyroscope comprising a rotor, a gimbal for rotatively supporting said rotor, potential energy driving means for said rotor entirely contained by said gimbal, caging means for holding said rotor in caged position, and means for releasing said potential energy means in order to rotate said rotor, said caging means being responsive to said releasing means to uncage said rotor.

References Cited in the file of this patent
UNITED STATES PATENTS

| | | |
|---|---|---|
| 942,952 | Wrather | Dec. 14, 1909 |
| 983,467 | Waldron | Feb. 7, 1914 |
| 1,180,815 | Anschutz | Apr. 25, 1916 |
| 2,567,948 | Lane | Sept. 18, 1951 |